(12) United States Patent
Kahn et al.

(10) Patent No.: US 6,404,416 B1
(45) Date of Patent: Jun. 11, 2002

(54) UNCONSTRAINED POINTING INTERFACE FOR NATURAL HUMAN INTERACTION WITH A DISPLAY-BASED COMPUTER SYSTEM

(75) Inventors: Robert E. Kahn, McLean, VA (US); John H. Cafarella, Swampscott, MA (US)

(73) Assignee: Corporation for National Research Initiatives, Reston, VA (US)

( * ) Notice: Subject to any disclaimer, the term of this patent is extended or adjusted under 35 U.S.C. 154(b) by 0 days.

(21) Appl. No.: 09/030,646

(22) Filed: Feb. 25, 1998

Related U.S. Application Data

(63) Continuation of application No. 08/762,531, filed on Dec. 9, 1996, which is a continuation of application No. 08/257,079, filed on Jun. 6, 1994.

(51) Int. Cl.[7] .................................................. G09G 5/08
(52) U.S. Cl. ........................ 345/158; 345/179; 345/180
(58) Field of Search .............................. 345/179, 180, 345/156, 157, 158, 172, 1, 2; 348/383, 36, 39; 341/22

(56) References Cited

U.S. PATENT DOCUMENTS

| | | | |
|---|---|---|---|
| 4,591,841 A | 5/1986 | Gunderson et al. ......... | 345/180 |
| 4,814,552 A | 3/1989 | Stefik et al. ................ | 345/177 |
| 4,884,068 A | 11/1989 | Matheny et al. ............ | 345/180 |
| 5,045,843 A | 9/1991 | Hansen ....................... | 345/180 |
| 5,341,155 A | 8/1994 | Elrod et al. ................. | 345/179 |
| 5,349,460 A | 9/1994 | Ogasahara et al. ......... | 345/157 |
| 5,420,607 A | 5/1995 | Miller et al. ................ | 345/179 |
| 5,504,501 A * | 4/1996 | Hauck et al. ............... | 345/158 |
| 5,581,269 A | 12/1996 | Butcher ...................... | 345/180 |

FOREIGN PATENT DOCUMENTS

| | | | | |
|---|---|---|---|---|
| DE | 40 00 518 | 9/1990 | ........... | G06F/3/037 |
| EP | 0 312 095 | 4/1989 | ........... | G06K/11/06 |
| EP | 0515015 | 11/1992 | | |
| JP | 59-212945 | 12/1984 | | |
| WO | 91/18383 | 11/1991 | | |
| WO | 92/09062 | 5/1992 | | |

* cited by examiner

*Primary Examiner*—Dennis-Doon Chow
(74) *Attorney, Agent, or Firm*—Fish & Richardson P.C.

(57) ABSTRACT

An unconstrained pointing interface for natural human interaction with a display-based computer system includes a hand-manipulated pointer configured to permit it to be (1) aimed by line of sight to point at any arbitrary position within the user's field of view, including positions beyond the user's natural reach, and (2) swept along any arbitrary path and at any arbitrary speed within the user's natural capability. A detector detects emanations from at least some positions at which the pointer may be aimed; and circuitry identifies the locations of positions at which the user is aiming the pointer. The interface enables the user to point to a position within his field of view and beyond his reach, move his hand along any arbitrary path and at any arbitrary speed within the user's natural capability to point to another position, and so on, and to have the circuitry automatically identify the locations of the series of positions to which he has pointed.

36 Claims, 5 Drawing Sheets

UNCONSTRAINED POINTING INTERFACE FOR NATURAL HUMAN INTERACTION WITH A DISPLAY-BASED COMPUTER SYSTEM

This is a continuation of U.S. application Ser. No. 08/762,531, filed Dec. 9, 1996, (pending), which is a continuation of U.S. application Ser. No. 08/257,079, filed Jun. 6, 1994.

BACKGROUND

This invention relates to pointing interfaces for human interaction with display-based computer systems.

Pointing is one of the simplest ways for a person to indicate his wishes or convey information to others. And pointing (for example, to words written on a whiteboard, or to parts of a painting represented on a projected image, or to places on any of the infinite variety of real-world objects) is one of the most common aids to conversation, instruction, and cooperative effort.

Pointing devices run the gamut from fingers, pointing sticks, and other mechanical and illuminated instruments, to light pens, touch pads, computer mice, touchscreens, and other electromechanical and electronic pointers. Pointing may be direct pointing along a line of sight to a target (as when a pointing device is directly aimed at a portion of display of a radiated or otherwise projected image) or indirect pointing (as when a mouse is manipulated to control the position of an image of a pointer on a display, without pointing the mouse itself at the display).

When the pointing is directed to a place on an object which is being shown on an electronic display (e.g., to a command icon appearing on a CRT), the act of pointing must be linked by some sort of electronic processing to the target command icon.

In the case of a mouse, the identity of the target command icon may be inferred from the location of the pointer on the display at the time of a mouse click. In the case of a light pen, the raster scanning of the display permits a one-to-one mapping of moments in time to points on the display so that the moment when light from the target location is detected by the pen implies the target location.

In one traditional class of computer interface, the user types sequences of text commands to control what the computer does. Also common are menu driven systems in which the user makes selections of actions from predetermined lists. In recent years graphical user interfaces (e.g., the Microsoft Windows interface) have become popular. In a typical graphical user interface, the user causes a displayed pointer to move across the display by manipulating a mouse and "clicks" a mouse button to indicate an action.

SUMMARY

The invention provides a visual interface which is virtually as natural as the simple human act of pointing with a finger to any place or sequence of places within a person's field of view. Unlike a keyboard, the interface is not confined to a limited number of actions but enables unconstrained pointing motion in any direction. Unlike a mouse or track ball, the user is not obligated to make a complex mental connection between motions of the device and a cursor on the screen. Also unlike a mouse or track ball, the user's pointing can jump rapidly among a succession of places on a display and yet the system is capable of determining immediately the absolute location of each place on the screen, rather than requiring the determination to be made relative to the prior target. Unlike a touch screen or similar device, the user need not be within arm's reach of the display, but could be across the room or in an auditorium. The display part of the interface could be as small as a single screen or as large as a wall-size array of screens. The places to which the user is pointing need not even be on a computer screen but could be on everyday objects, e.g., a painting hanging on a wall, provided that appropriate scanning equipment is used. The object need not even be planar. Furthermore, two, three, or even more users may interact with the interface simultaneously and independently, with the system immediately determining the absolute locations of the places to which each user points. In one mode of use, several users could interact with one another and with a computer display (or displays) while moving around a room and pointing at different parts of the display (or displays) in a completely natural way.

In one general aspect of the invention, the interface includes a hand-manipulated pointer configured to permit it to be (1) aimed by line of sight to point at any arbitrary position within the user's field of view, including positions beyond the user's natural reach, and (2) swept along any arbitrary path and at any arbitrary speed within the user's natural capability. A detector (e.g., in the pointer, or associated with it) detects emanations (from the display) from at least some positions at which the pointer may be aimed; and circuitry identifies the locations of positions at which the user is aiming the pointer (and thus aids in determining, e.g., the timing of events and the identity of the user). The interface enables the user to point to a position within his field of view and beyond his reach, move his hand along any arbitrary path and at any arbitrary speed within the user's natural capability to point to another position, and so on, and to have the circuitry automatically identify the locations of the series of positions to which he has pointed.

Implementations of the invention include the following features. The circuitry (which may or may not be located in the pointer) identifies the location, within a coordinate system, of each position in the series of positions. An event generator (e.g., a push button on the pointer) enables the user to generate events associated with positions at which the user is aiming the pointer.

The emanations differ at different positions, and the circuitry identifies the location of each position based on differences in the emanations. The differences in the emanations may comprise differences in time of occurrence, e.g., those associated with raster scanning of the positions. The arbitrary positions to which the pointer may be aimed may lie on a substantially planar surface on a pixel image display device, e.g., a raster scanned CRT. Some implementations may use a static display and may impose a raster-like scan on the static display by altering the appearance of successive lines shown on the static display.

The emanations may include electromagnetic radiation, such as visible light or non-visible infrared radiation. In some implementations, the emanations may originate at their positions on the display. In some implementations, the emanations may only be reflected from the positions. In the latter case, the reflections may be of scanned emanations, e.g., a vertical or horizontal line of emanations (whether visible or not) scanned across a static screen or even an everyday object.

The detector in the pointer may be of the kind that separately detects emanations received at multiple receivers (e.g., multiple independent sensors in the pointer), and the system may include circuitry for generating a monopulse position estimate based on the emanations received at the multiple receivers. The detector, the circuitry, and the event generator all may be part of the pointer. The events generated by the event generator may be event signals delivered by wire or by electromagnetic radiation.

There may be a second (and a third or more) hand-manipulated pointer(s), detector(s), and event generator(s); and the circuitry may also identify the location of each position at which the other pointers are aimed.

The arbitrary positions to which the pointer may be aimed may lie on a display system of multiple, separately scanned pixel image display surfaces. The interface may enable the user to point to a position on any one of the display surfaces, move his hand along any arbitrary path and at any arbitrary speed within the user's natural capability to point to another position on another one of the display surfaces, and so on, and to have the circuitry automatically identify the locations of the series of positions to which he has pointed. The display surfaces may be raster scanned using respective timing signals which may be synchronized or unsynchronized among the display surfaces.

A display identity detector (within the pointer or external to it) may detect on which display is the position at which the pointer is aimed. The display identity detector may include multiple spaced-apart sensors which detect emanations from the pointer, and a monopulse circuit which delivers a signal identifying the display at which the pointer is aimed, based on the emanations detected at the multiple sensors. The pointer may include a source oriented to deliver electromagnetic radiation to the spread-apart sensors. The image display surfaces may be rectangular and arranged in an array, and the sensors may be located at the corners of the display surfaces. The monopulse position signal may generate information associated with the rotational orientation of the pointer. Alternatively, the scan lines of the different displays may be generated in different colors which would enable the determination of the display at which the pointer is aimed to be determined by the pointer.

Other advantages and features of the invention will become apparent from the following description and from the claims.

DESCRIPTION

Figure 1:
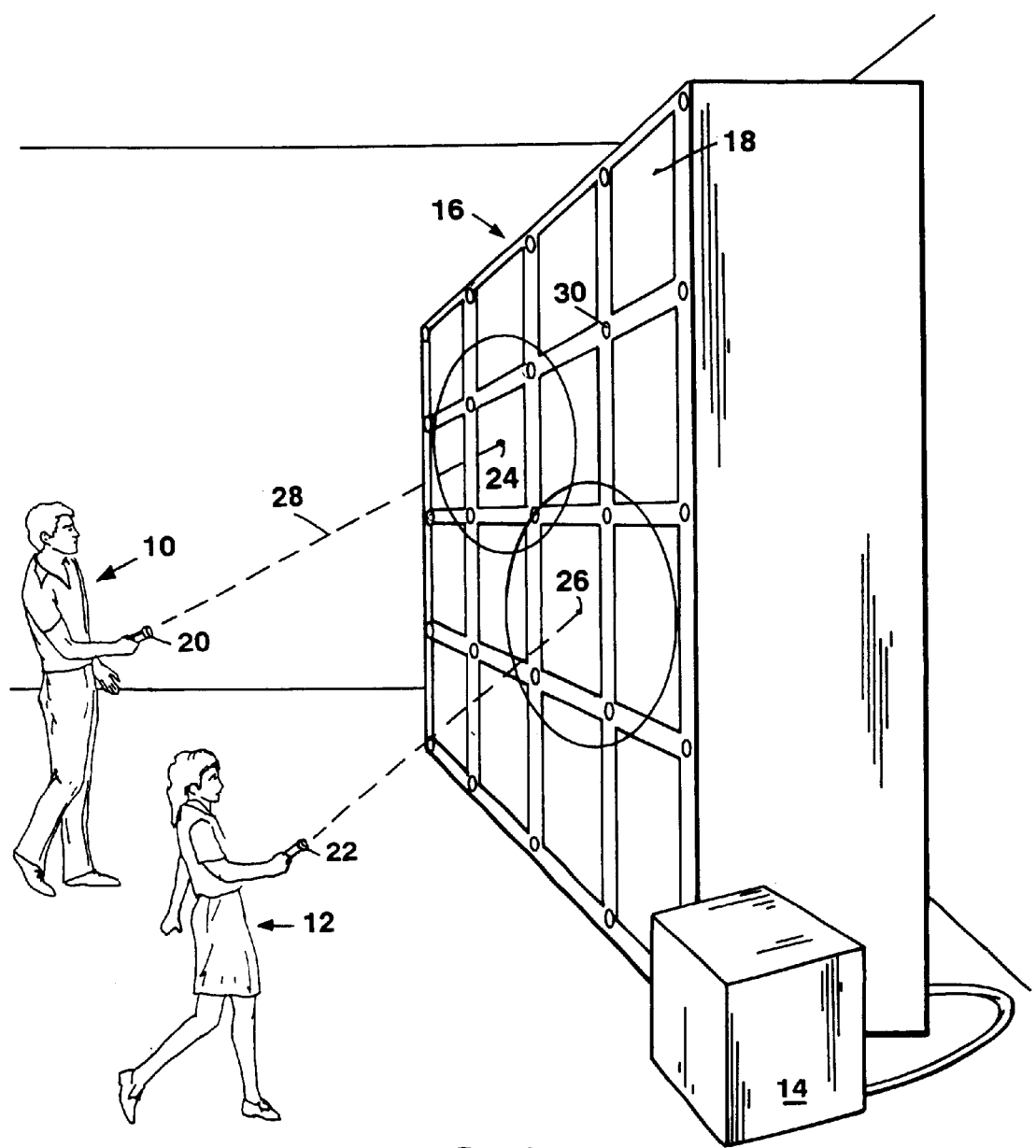
FIG. 1 is a perspective view of a visual user interface for a computer.

As seen in FIG. 1, one example of an interface which enables two users 10, 12 (or more) to communicate with a computer system 14 (e.g., a personal computer running multiple user applications such as a spreadsheet program, a word processor, a multimedia viewer) includes a display system 16 in the form of a rectangular array of raster scanned CRT display screens 18. The information displayed on the screens may be of any kind, including images, visual interfaces provided by graphical operating environments (e.g., Windows), menu driven programs, and command line interfaces. Different display screens may show unrelated information. Display screens may be grouped to display related information. For example, the four screens in the upper right hand corner of the array may show a Windows interface (each of the four screens showing one-fourth of the interface) while the rest of the screens display other images.

In the Figure, each of the users is shown holding a pointer 20, 22 in the shape of a very small flashlight with pushbuttons or other activating mechanisms. Each pointer allows its user to point to a position 24, 26 or an arbitrary succession of positions, or any arbitrary path across any one or more of the screens. The buttons or other activating mechanisms (not shown in FIG. 1) may be pressed to indicate actions to the computer system.

The specific choice and arrangement of buttons or activating mechanisms is a matter of design choice but, whatever, the choice, it is desirable to provide for several different kinds of action by the user, somewhat (but not completely) by analogy to the several different actions that may be taken by a user of a conventional mouse.

One kind of action is to indicate to the visual interface system whether the user wishes the pointer to be "alive" at all, or not. This may be accomplished by a button which we shall call the "in use" mechanism. By deactivating the in use mechanism, the user may move the pointer around, and gesture, without the motion or gesturing having any effect on the user interface (i.e., with somewhat the same effect as removing one's hand altogether from a conventional mouse). By activating the in use mechanism, the motions of the pointer, and activation of other buttons may be used to interact with the user interface. When the pointer is in use, the designated position (the position at which the pointer is aimed) constitutes an implicit cursor for purpose of taking other actions. The implicit cursor may or may not actually be displayed. Any action that may be taken at a cursor position in a conventional computer system, e.g., a click or double click by a mouse, may be taken with regard to the implicit cursor.

Another kind of action is to create markers at displayed positions. Markers are merely symbols displayed at positions where the cursor had been at an earlier time and which the user had chosen to mark. We call this the marking mechanism. Markers may take any form or shape on the screen.

Another kind of action is to indicate when the designated position is intended to match a marker of a previously marked position for the purpose of selecting that marker and taking an action on the marker itself. The action may be to move the marker to another location (e.g., dragging or jumping to the new position) or to take action on a set of markers (e.g., selecting the set). We call this the "marker designation mechanism".

Another kind of action is to indicate that some event should occur with respect to something (e.g., selection from a menu) that is associated with a marker, a set of markers, or the implicit cursor. This is somewhat analogous to a click or double click of a mouse button. We call the mechanism that enables this action the event mechanism. The event mechanism could be combined with the marker designation mechanism in a single button that is clicked once for marking or marker matching, held down during slewing to indicate a drag action, or double clicked (possibly on an associated menu) to designate an event.

Each user may use his in-use, event, marking, and marker designation mechanisms independently of, and simultaneously with, other users making use of their mechanisms. The computer system determines immediately which pointer is taking which action with respect to which position or positions on which of the display screens.

The users may be anywhere within sight of the display system 16, including at locations which are beyond reach of the display system. For example, the users could be in a room as small as an office or the size of an auditorium.

The visual interface system includes a display control system (not shown in FIG. 1) which determines, among other things, the display screen 18 and the location of the designated position at any time, and the state of the in-use mechanism, the event mechanism, the marking mechanism, and the marker designation mechanism. To make these determinations the display control system must obtain and analyze information which links the motion and control of each pointer with positions on the display screens of the display system. In the example of FIG. 1, this is done based on the fact that the display screens emit raster scanned light toward the users. Each screen is raster scanned in successive horizontally painted scan lines so that at any moment in time only a single position on each screen is emitting light toward the pointers. Each pointer has a detector for receiving light from the designated position. By comparing the time at which the light from the designated position is detected at the pointer (we call this the "time of designated position" or TODP") with information about the raster timing of a given screen, it is possible to determine quickly the absolute location of the designated position on the screen without reference to prior designated positions. In the case of multiple screens, it is necessary to know the timing of the raster scan of each screen (when the scanning is unsynchronized among screens) or the global scan timing (when the scanning is synchronized).

Because more than one of the screens may be emitting light at a time, a determination should also be made of which screen bears the designated position. The determination of timing in the pointer depends on use of an optical discriminator (e.g., lens) to discriminate between screens. To convey the screen and timing information to the display control system, each pointer also has a source of emanations which delivers a beam of electromagnetic radiation (e.g., infrared) 28 that is centered on the designated position. The display system has detectors 30 for this in-bound beam, one detector at each corner of each display. (Other positions for the detectors are also possible.) When the user is aiming the pointer at a designated position, the beam from the pointer covers an area around the designated position which is broad enough to assure its detection by all in-bound detectors 30 or the display intended. By a monopulse technique described in more detail in Appendix B, the signals from the in-bound detectors are used to determine which of the screens contains the designated position. If only one screen is involved, only a single detector is needed to determine which user is transmitting and to receive timing and other communication signals, but multiple devices provide higher reliability. Monopulse processing may also be used in the pointer to achieve accurate timing information.

The beam 28 may itself provide (or may be augmented by a narrow beam light source—e.g., a laser designator—to provide) a "passive" indication (a light spot on the screen) of the general aiming direction of the pointer; the beam also may be modulated to provide a communication channel from the pointer to the display system. This channel carries information from the pointer to the display system identifying the pointer, specifying the TODP, and describing the state of the in-use mechanism, the event mechanism, the marking mechanism, and the marker designation mechanism. Alternatively, the channel could be carried on a wire from the pointer to the display system (line 503 in FIGS. 2 and 3).

Figure 4:
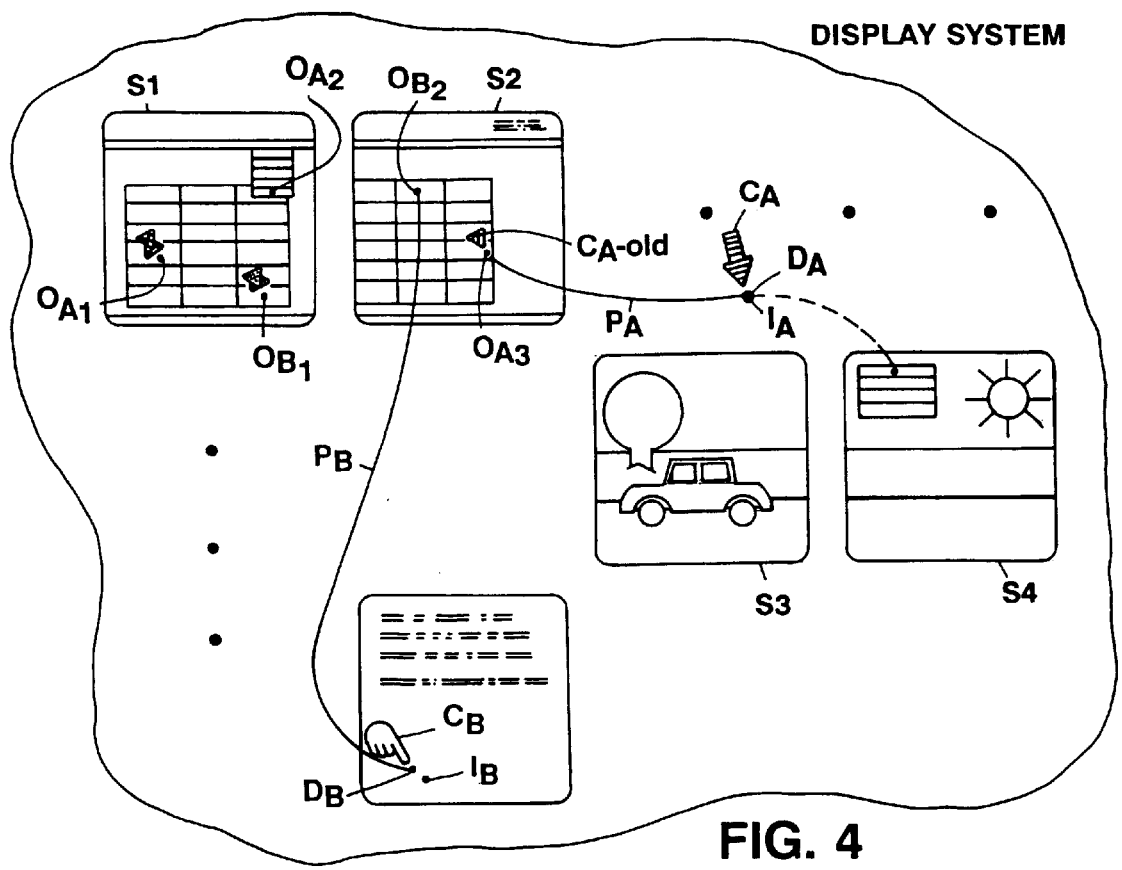
FIG. 4 is a view of a portion of the display system in use.

Referring also to FIG. 4, although not required, the system may display one or more user specific location pointers (e.g., markers or icons in the shape of arrows with different colors and/or shapes) for each user to provide visual feedback while the user is aiming the pointer at either a designated position or an intended position (by "intended position" we mean the position at which the user wishes to aim; by "designated position" me mean the point actually aimed at whether intended or not). The displayed position of each icon or marker is synchronized with the designated position or intended position either automatically or by operation of the marker designation mechanism. In FIG. 4, for example, an arrow icon CA of a user A is shown (in one color) pointing at a currently designated position DA; a marker CA-OLD points to a place where user A had previously pointed. A differently colored, pointing finger icon CB of a second user B is simultaneously displayed at a different currently designated position DB. Based on the user's perception of any "error" between the displayed or displayed position and the intended position, the user may move the pointer slightly to correct the error. Computer programs may also be able to assist in making the slight adjustments in certain cases.

Each user may control the displayed position within a single display screen 18 by invoking the marking mechanism and the marker designation mechanism to cause the displayed position to be at the designated position. While the user is aiming or re-aiming the pointer, the system may or may not continue to display the old displayed position, or may move the displayed position with the designated position (in the case of a dragging action). If the system does not initially move the displayed position with the designated position, it may do so automatically once the designated position remains temporarily stationary or when the user invokes the marker designation mechanism. The displayed position may subsequently move if the marker designation mechanism is again triggered later on.

The user typically works in two ways with the pointer. In a tracking mode, the user is changing the designated position and may be manipulating the displayed position with respect to the designated position using the marking and marker designation mechanisms. During tracking mode, the system may allow multiple designated positions to be remembered and/or displayed.

When the designated position reaches the edge of the screen and moves to the adjacent screen during tracking, the displayed icon tracks smoothly to the new screen.

In the example of FIG. 4, user A had begun with the designated position at an old displayed position OA1 (which bears an hour-glass marker), then moved to old displayed position OA2 (also bearing a marker), then to OA3 all within a spreadsheet program displayed across two screens S1, S2. From position OA3 the user had dragged the spreadsheet value in the cell at OA3 toward a frame in a graphics program displayed on screens S3 and S4. The currently designated position DA is slightly offset from the intended position IA.

During the same period, user B had followed a sequence that included an old displayed position OB1, then OB2, and then had dragged the value in the cell at OB2 to a word processing program running on screen S5.

With multiple users, any apparent interaction among them may be inferred by underlying software.

Other commands, for example, commands which correspond to a second or third button on a mouse, could also be implemented.

The Pointer

Figure 2:
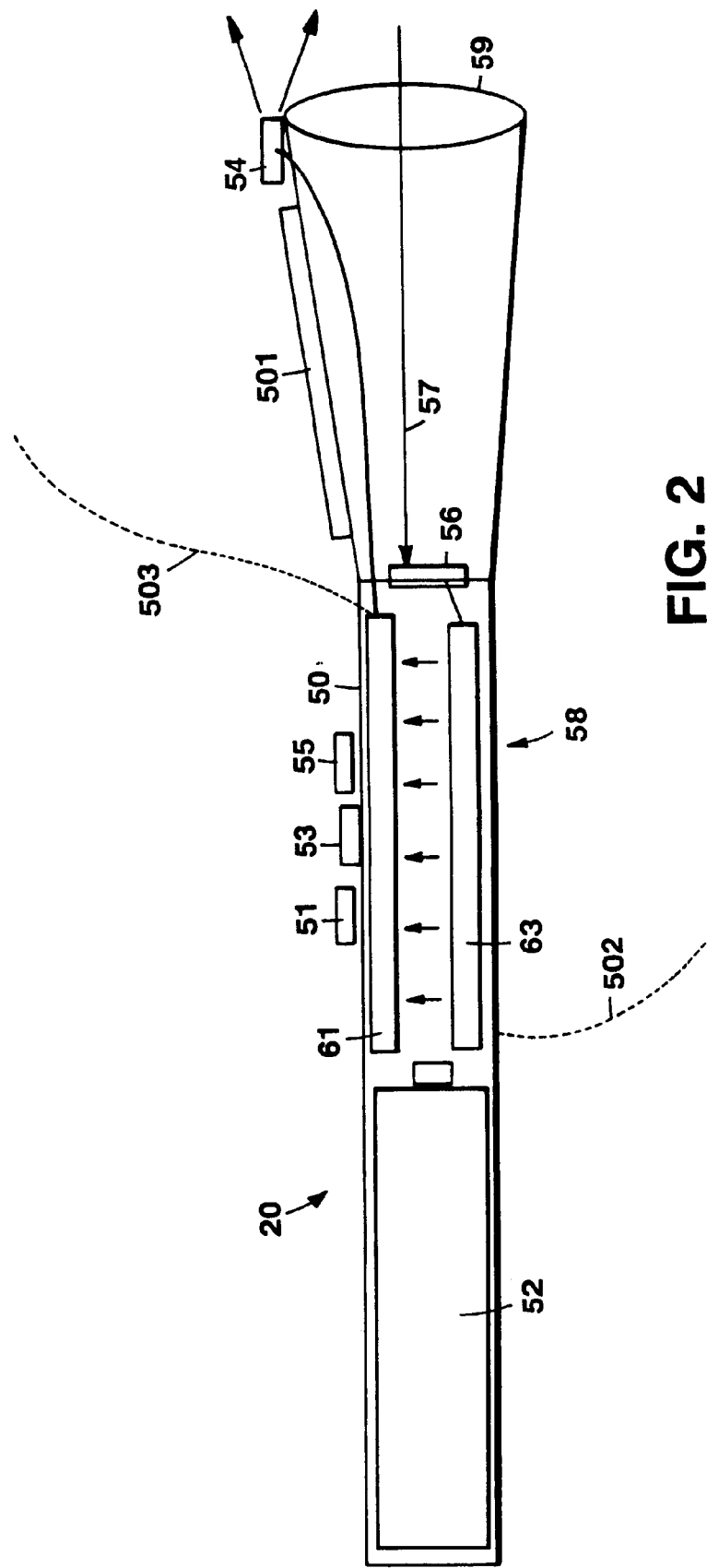
FIG. 2 is a schematic sectional side view of a pointer.

Referring to FIG. 2, pointer 20 includes a case 50 holding one or more batteries 52, a beam source 54, a detector 56 for light received from the designated position on one of the screens, a lens 59 for focusing the incoming light onto the detector, activating mechanisms (e.g., buttons) 51, 53, 55, and pointer control circuitry 58 including detection circuitry 63 and communication circuitry 61.

Figure 3:
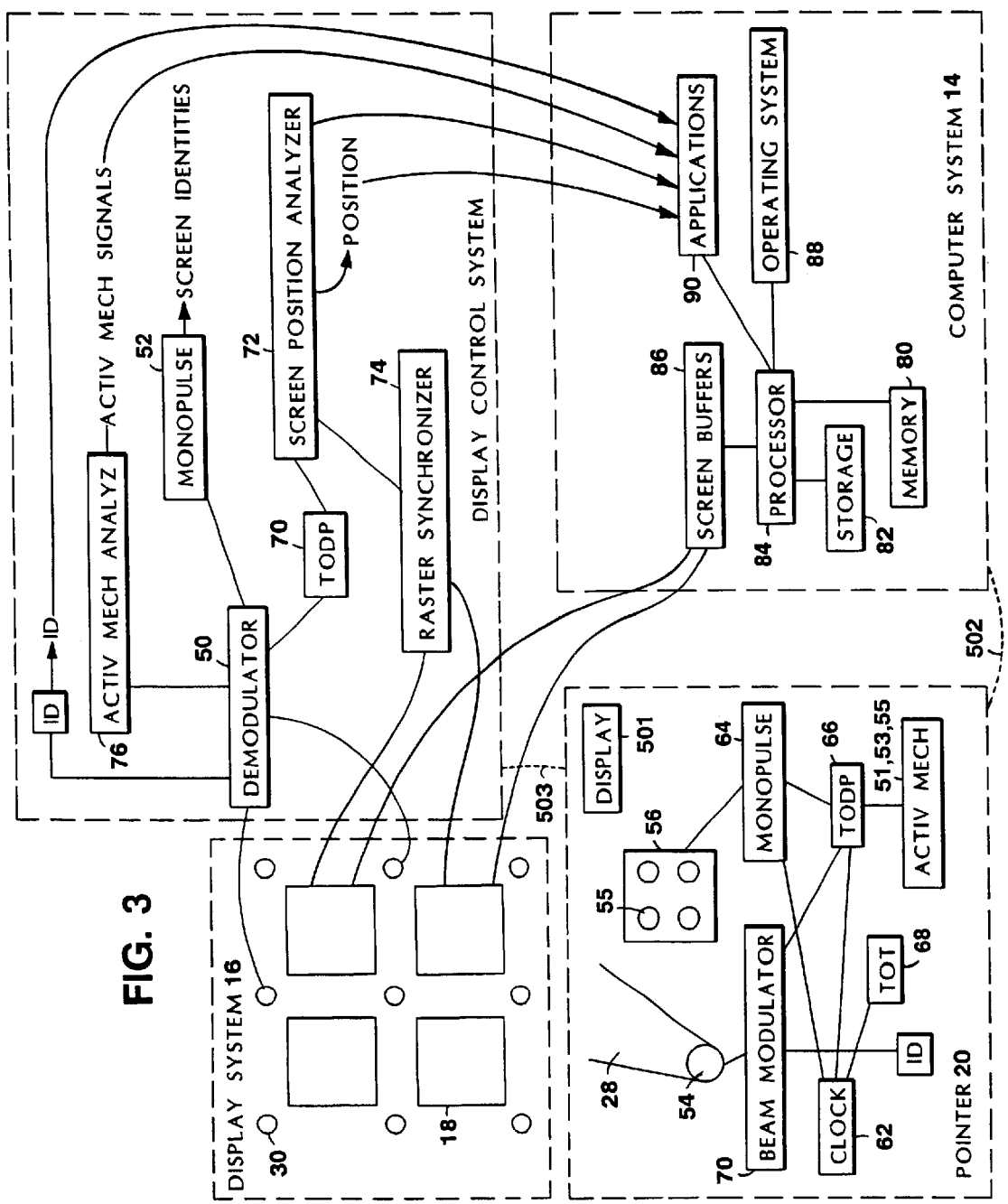
FIG. 3 is a block diagram of the components of the overall visual interface system.

Referring to FIG. 3, the detector 56 in the pointer has signal processing circuitry and four pixel values 55 logically arranged in a square. The pointer control circuitry in the pointer includes a clock 62, and a monopulse circuit 64 for receiving signals from the sensors 55 and for delivering corresponding signals indicating the centroid of the arriving light. A TODP element 66 uses clock signals and a signal from the one of the activation mechanisms 51, 53, 55, if any, to generate a TODP signal indicating the time at which light was received from the designated position. A TOT element 68 uses clock signals to generate a time of transmission signal.

The communication portion of the pointer circuitry includes a beam modulator 70 which modulates the beam source 54 in accordance with the TODP and TOT signals and other information described below. Signals from the activation mechanisms may also be modulated on the beam so that the system can distinguish between and operate differently at times when various ones of the activation mechanisms are being invoked.

Infrared-based signals generated at the display system sensors 30 are delivered to a demodulator 50 which is part of the detection system (which is part of the display control system 32). The demodulator output passes to three elements where it is analyzed to produce control signals for delivery to the computer system 14. A monopulse element 52 analyzes the sensor outputs, determines centroids of incoming light beams from various pointers, and, from the centroid information, determines which screens are the targets of the pointers. The observed amplitudes at the sensors are fitted to the expected spatial pattern for the user's pointer illumination, conditioned on the designated position. This information is passed to the computer system as screen identities linked to pointer ID's. A TODP element 70 uses the demodulator output signals to recover the TODPs for the various pointers and delivers corresponding signals to a screen position analyzer 72. Analyzer 72 uses the TODPs and raster information from a raster synchronizer 74 to derive the designated positions on the screens.

An activation mechanism analyzer 76 extracts the states of the activation mechanisms from the demodulator output and delivers corresponding activation mechanism signals to the computer system 14.

Computer system 14 includes the usual processor 84, storage 82, memory 80, and screen buffers/drivers 86. A real-time operating system 88 and applications 90 run on the system. In the case of a single application running on a single screen, the activation mechanism signals and position signals from the interface control system may simply be sent to the computer system much in the way that motion and click signals are sent from a mouse. In the case of multiple screens (and possibly multiple applications) the computer system must include hardware and software which can differentiate among the screen identities, positions, and activation mechanism signals originated from different ones of the pointers. Because the computer system "knows" which application is running in each portion of the display system, the commands from the different pointers can be sorted out and delivered to the appropriate applications.

Transmission of Timing Information on the Modulated Beam

The pointer measures TODP relative to the local clock 62 in the pointer to avoid critical timing between TODP and the raster timing. Sending both TODP and TOT data from the pointer to the display system enables precise computation of TODP at the receiver end without requiring a high timing precision (e.g., 10 nsec.) to be maintained over the communication channel. The sensors at the corners of the screens permit redundant demodulation and combining of the received communication signals. Multipath signals may be explicitly allowed or the environment may be engineered to essentially eliminate them.

The frequency of data transmissions from the pointer to the display system may be reduced (from once for each raster line scan) by allowing the pointer to average the estimates of TODP over several (e.g., eight) raster scanned frames. A possible update rate on the order of 10/sec would be reasonable based on a 100-msec. human sensory time. Use of a power of two for the frame-averaging interval would make division by the number of frames a simple shift register operation. The number of frames used for averaging could be dynamically selected to support varying requirements for update rate.

The actual update interval also may be varied to avoid repeated (periodic) collisions between two pointers whose transmissions happen to collide once. For example, for an 8-frame averaging interval, a pointer could insert a pause of 1 to 3 frame times, chosen pseudo-randomly for each transmission.

The transmitted TOT and TODP timing signals may be but need not be of full resolution. For a 1024×1024 pixel screen, 20 bits are required to specify the timing of an event to pixel-level precision within a frame. TOT could be restricted to a coarser grid of times corresponding to the four least significant bits being zero. The display control system could measure arrival time of a transmission unambiguously within the time required for four line scans of the screen, so the TOT could be restricted to 256 possible values per frame time, requiring only 8 bits. After completing the multiple frame averaging to estimate TODP, the pointer would transmit its report at a TOT opportunity within the next four-line-scan interval containing the TODP; 12 bits of TODP data would be required to specify when within the four-line-scan interval TODP occurred, while the four line scan interval would supply the remaining eight bits required for TODP just as for TOT. The display system would resolve the pointer's timing and then TODP would be computed.

The communication signals from the pointer to the display system could use the following format.

| bits | use | explanation |
| --- | --- | --- |
| 1–8 | synch | acquire data-sampling clock |
| 9–16 | ID | supports 256 pointers |
| 17–36 | timing data | see below |
| 37–44 | activation status | see below |
| 45–47 | error control | see below |

The timing data for use with a raster display consists of 8 bits for TOT and 12 bits for TODP. For a static display (see discussion below) the data is 10 bits each for the two equivalent coordinates. Three bits are provided for error checking. Eight bits are provided for carrying status information (on/off) for up to 8 activation mechanisms on the pointer. Optionally, additional bits may be assigned for non-binary activation mechanisms.

To support multiple simultaneous users, the beam from each pointer would be coded for uniqueness possibly using spread spectrum. The display control system would identify the designated positions and sort them out by reading the code, or by using the code as a spread-spectrum signal. Activation mechanisms could be effected using alternate coding of the beam, as could security ID codes.

Monopulse in the Pointer

Figure 5:
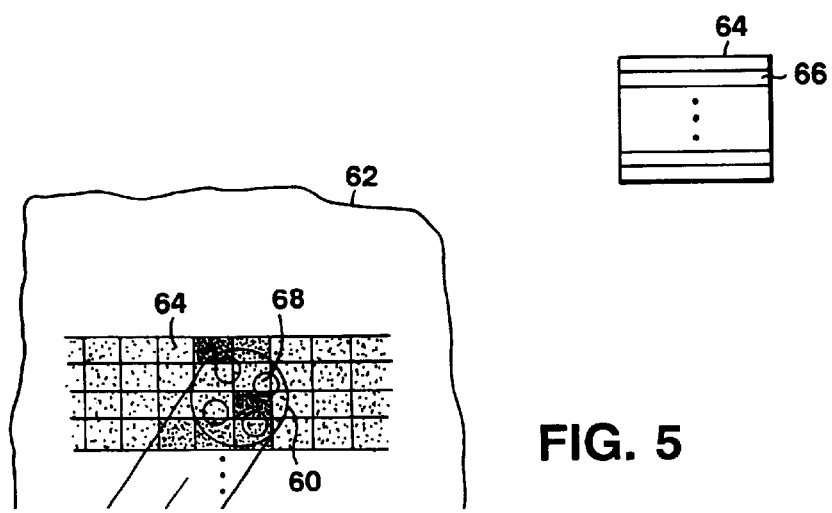
FIG. 5 is a schematic diagram of a pixel and a designated position on a display screen.

Monopulse detection in the pointer overcomes the adverse influence of variations in light intensity associated with the displayed information on the screen. As seen in FIG. 5, a designated location 60 on the surface of a screen 62 may include several pixels of different intensities. Each pixel may span multiple emanation areas of the screen, e.g., 16 scan lines. As a practical matter, the high resolution in the vicinity of the designated position at the surface of the screen cannot easily or cost effectively be matched at a detector in the pointer. The actual temporal information received at the detector is usually associated with a sequence of blurred line scans modulated by the light intensity pattern at individual local pixels. The effect is further complicated by variation in colors. In the monopulse approach, each of, for example, four detectors receives light from a region 68 of the display and use generates an intensity signal as an input to a centroid computation.

Monopulse in the Display System

The source in the pointer delivers a broad beam of electromagnetic radiation centered in the direction of the designated position. The breadth of the beam must be enough to assure that it would strike all of the beam sensors for the display of interest regardless of the designated position on that display. Except when the initial designated position falls near the edge of the entire display system, monopulse based on the broad beam from the pointer will give a satisfactory identification of the correct screen. Any error in this process is likely to be similar in magnitude to the initial pointing error made by the user before some visual presentation on the screen (feedback) guides him to the desired position.

To avoid ambiguities between adjacent screens in the display, the display system may be raster scanned as if it were a single screen, by sending synchronizing pulses from the raster synchronizer 74 to all screens. Monopulse yields the pointing centroid with an accuracy to approximately 20% of the screen width. Synchronizing the rasters assures that no two individual screens could simultaneously trigger a TODP from a single pointer. Synchronizing the rasters is a straightforward process involving delivery of an external timing signal to all the displays.

While ambiguity in the vertical dimension is unlikely, additional margin may be required to avoid ambiguity on the horizontal sweep because of its higher frequency. Alternate displays could reverse their horizontal sweep directions (displays would form a checkerboard pattern in two dimensions of alternating sweeps). Because the pointer has a specific rotational orientation, the sequence of null-line crossing just before and after TODP uniquely determines whether the sweep was from right to left or from left to right.

Additional details are found in Appendix C.

Security

It may be desirable to provide a way to register users (by session or for specific periods of time) to protect against unauthorized access. A security process running on the computer system could authenticate users as a condition to allowing them to use a pointer to interact with the system. In the absence of a software security process, manual registration of users could be used.

The security process would check that a user is authorized to access the system, and would also convey any restrictions, e.g., user X cannot point to things on screen Y. The security process could be a general function or some or all of the security functions could be integrated directly into the applications.

When a user appears for the first time, or re-appears, the system establishes a pointing session for the user. This includes coordination with the security function to determine the various display permissions to which the user is entitled. If the user disappears for too long an interval, the pointing system terminates the session.

When a user has been off for less than the session time-out interval and re-invokes the in-use activation mechanism, the system determines which screen has been selected by the user by examining the information received from the display control system. This is done initially using estimates of the newly designated position derived by monopulse processing on the in-bound beam from the pointer, then subsequently from the TODP signals received from the pointer.

Other embodiments are within the scope of the following claims.

For example, the display system could be a single screen. A single user could make use of the system. The pointer could be a variant of the commonly used laser pointer. Multiple users could also make use of the system. Spread spectrum or other multiplexing techniques could be used to share the display control system among the various users.

The system could use information that is being displayed in the vicinity of a designated position to aid the process of identifying the designated position. For example, if the user invokes an activation mechanism while attempting to aim the pointer at a command button of a graphical user interface, and if the aim is only slightly "off" the button, the system may assume that the designated position is "on" the button and so display the pointer there (either waiting for confirmation by the user or implicitly assuming confirmation unless countermanded quickly by the user.)

A feedback communication channel could be provided from the display system to the pointer to provide control information and a status display. For example, as shown in FIGS. 2 and 3, in a multi-user game, the pointer could locally display (e.g., on an LED display 501) a score. The feedback channel could be carried by a wire 502 or by a beam from the display system to the pointer.

Static Display

The scheme for detecting the designated position may also be applied to static (non-raster scanned) screens by imposing an artificial and temporary pseudo-raster on the screen in the form of a temporal-spatial screen activity that can be sensed at the pointer.

The pseudo-raster need not scan out individual pixels serially as in a true raster scan. Instead, it could first generate a horizontal line in a vertical scan, then a vertical line in a horizontal scan. This could even be a relatively bright line, because the user will not perceive its presence, or it could be a fixed change in intensity added to each pixel as the line scans. In the latter case, the background would be blocked out by a high-pass filter in the pointer detection circuitry.

Repetitive scanning could be randomized to avoid scan-to-scan integration in the eyeball but this is not necessary because the appearance of the pseudo-raster would present only a very slight change in the uniform background intensity. The scanning of the vertical and horizontal lines can be effected in under 1 msec. each; the human eyeball cannot detect the event because human cognition requires about 100 msec. The geometry of the optical detectors in the pointer could be selected to optimize performance for the pseudo-raster.

If the pointer reports the passing of the pseudo-raster each time, then the designated position can be determined. When either a vertical or horizontal line is scanned through the boresight of the pointer, both monopulse channels change sign simultaneously; thus, the channels provide redundant information. This redundancy could be removed by using pseudo-raster lines parallel to the detector null lines, but this would simply make one of the channels inactive.

Figure 6:
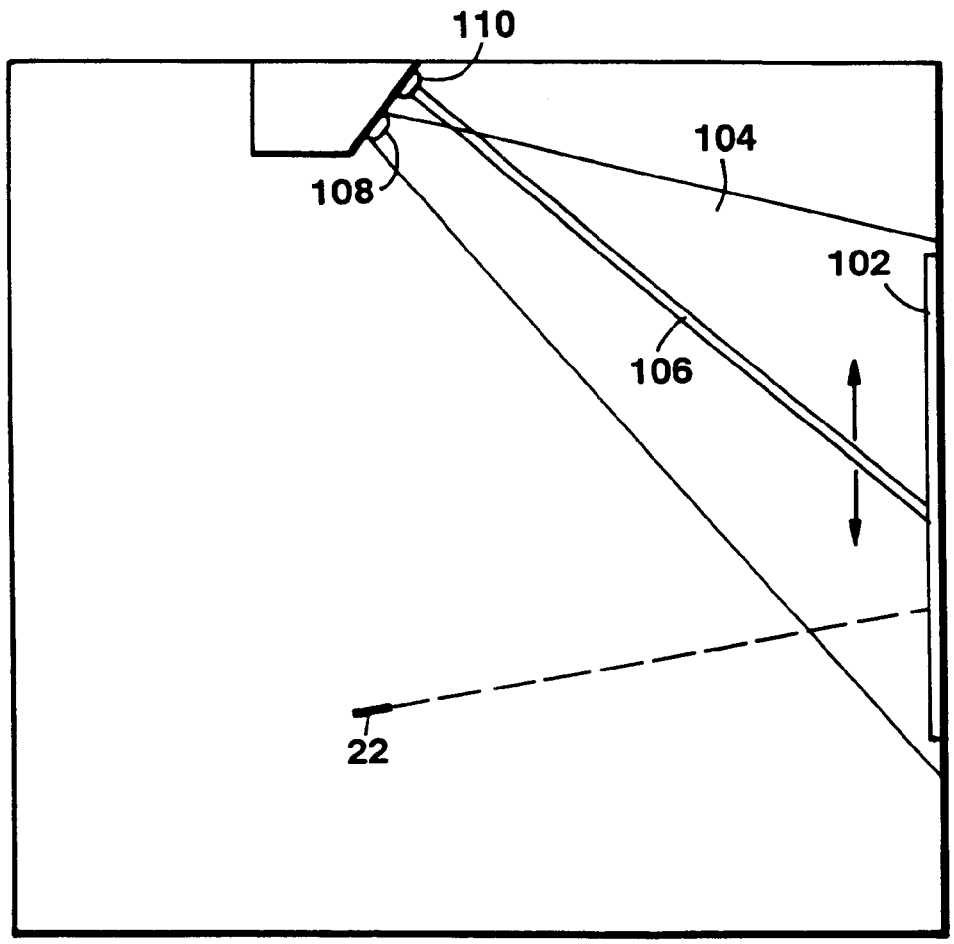
FIGS. 6 and 7 are side and front views of a painting being scanned.
Figure 7:
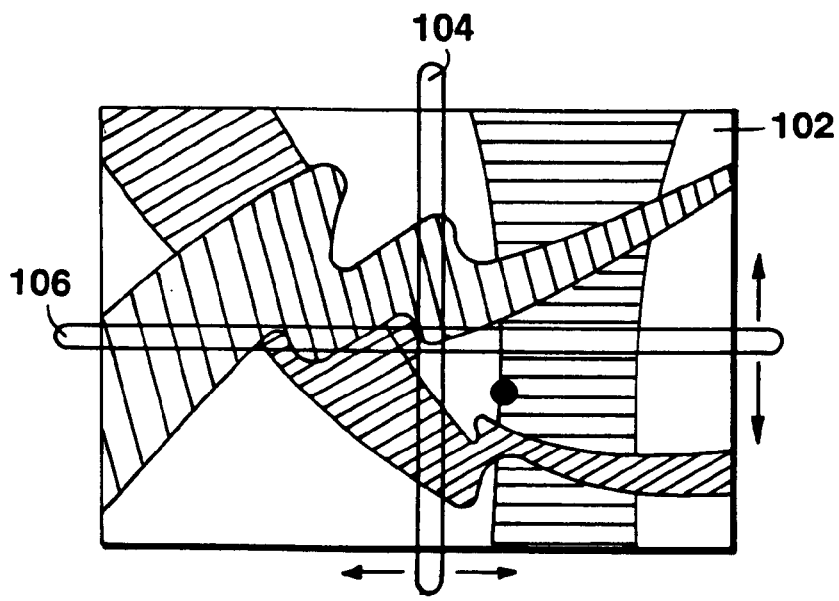

Referring to FIGS. 6 and 7, a similar technique could be used for pointing at designated positions on everyday objects, such as a painting 102 hanging on a wall. In that case, the pseudo-raster lines 104, 106 could be projected onto the object from projectors 108, 110 located at a distance from the wall. Reflected light from the scan lines would strike the pointer. The computer system could determine the designated position within a frame of reference defined by the scanned lines. See Appendix E for additional information.

Rotational Orientation

The algorithm suggested for the pointer estimation of TODP would work at nearly all rotations about the pointing axis, but it would behave poorly in some small range of angles about an angular orientation corresponding to the raster moving parallel to one of the pointer null lines. A variant algorithm, processing from line-to-line, could handle this case.

If the pointer algorithm were altered to operate at arbitrary rotation angles about the pointing direction, then this angular rotation could be measured as well. Current-generation software employs "button" actuators on the screen which can be "pushed" with a mouse. With the ability to sense angular rotation of the pointing device about its pointing axis, screen actuators could be programmed which allowed the user to rotate things like knobs and screwheads.

In-Bound Data Link

The in-bound beam could be designed to accept in-bound data from a variety of applications. For example, user responses to questions displayed on a screen could be sent via a modulated electromagnetic beam to the sensors on the display system.

Lines of Bearing

If quad sensors were substituted for at least one of the sensors placed at the corners of the screens, additional monopulse processing could give lines of bearing to the users. This would enable applications software to interact in interesting ways with the user's motion about the room.

Trajectory

The pointer enables direct (absolute) designation of features displayed on a screen; alternatively, it enables the description of a trajectory on the screen. Conventional mouse, trackball, and joystick devices, by contrast, provide only relative position corrections, while touch-screen interactions are relatively coarse and awkward. This could be used to trace a route on a map, or to do contour integration, or to write a signature.

Appendix A: Accuracy and Resolution

As the user "zeros in" on an intended position, the designated position will tend to wander by small amounts in the vicinity of the displayed position due, for example, to hand tremor or to fluctuating errors from the process of estimating the intended position. An estimate of this error is 0.1° RMS, with temporal correlation on the scale of 0.5 sec leading to a wandering of the designated position typically by ten to twenty pixels. The wandering could be filtered out of the system by averaging or by imposing a deliberate nonlinearity (dead-band effect), or the user could simply be expected to remove his finger from the push button.

Even if the pointer were clamped in a vise to preclude any mechanical motion, there still would be a residual fluctuation in the designated position due to noise in the process of estimating that position. For example, if a spot of light is displayed on the wall, then the accuracy with which the position of the spot can be estimated is given by $$\sigma_x, \sigma_y \approx \frac{d}{\sqrt{SNR}} \quad (1)$$

where $\sigma$ is the standard deviation in x or y, d is the 3-dB spot diameter, and SNR is the signal-to-noise ratio. For a half-inch spot and 20-dB SNR this would typically be about four pixels.

The system must deal with these fluctuations in the designated position. Because the pointer sub-system has no information about cursor position, it is attractive to have the pointer process handle the suppression of fluctuations. This would enable context-dependent behavior of the tracking of the designated position by the cursor, avoiding a trade-off between response time and positional stability.

If the designated position and/or the displayed position are slewing across the screen, then the inaccuracies caused by estimation errors or involuntary hand tremors are of no consequence, so the cursor-display process could simply slew the displayed position to catch up with the designated position. On the other hand, when the designated position remains stationary and the cursor position converges on that position, then the wandering of the designated position would become apparent; the cursor-display process could use any of a number of techniques to suppress fluctuations. For example, the position could be averaged over successively longer times as the designated position sits in the vicinity of the displayed location; this would enable the user to "tweak" the cursor position on a single-pixel scale.

Given a particular display system resolution, it would be disappointing not to be able to allow a user to move the intended position by a single pixel. If we consider a wall tiled with displays, it might be required to select pixels horizontally at 0.3-mm pitch over a 6-m field; this twenty-thousand-to-one ratio requires over sixteen bits of resolution. This is not an unreasonable resolution, especially when one considers that relative motions within a single screen require only ten-bit resolution. As a practical matter, the fluctuations in designated position due to thermal noise will provide virtually infinite resolution; this is similar to the washing out of A/D convertor "staircase" in signal-processing applications. Thus, the basic resolution always defaults to a pixel, as it depends upon the cursor-display process.

Appendix B: Analysis of Monopulse Technique

For a monochromatic display, the pointer would detect $$I(t) = W(x, y)e^{-\frac{(x-x_0(t))^2+(y-y_0(t))^2}{2\sigma^2}} * S(x, y) \quad (2)$$

where W(x,y) is the pixel-by-pixel pattern on the display, a is the (Gaussian) beam spot radius, ($x_0$,$y_0$) is the location of the electron beam raster spot at time t, and S(x,y) is the point-spread function (the two-dimensional spatial analog of the impulse function used in circuit theory) of the detector in the pointer. The convolution with the point-spread function corresponds to a spatial low-pass filtering to reduce the resolution. The displayed pattern W(x,y) can be arbitrary; in fact, a user is likely to choose designated positions where W(x,y) has considerable variation, because those are the areas of interest. Thus, an estimate of the time at which the raster position $(x_0,y_0)$ passes through a designated position (x',y') is likely to be wrong if based only on detector light amplitude versus time.

One solution to this difficulty is to have the pointer estimate the raster position $(x_0,y_0)$ by filtering out fluctuations due to W(x,y), and then to observe when the estimated raster position is at the designated position (x',y'). This can be done using an optical monopulse detector in the pointer, which automatically places (x',y') at boresight, i.e., on the optical axis between the pointer and the designated position as perceived by the user.

An optical monopulse detector has four sensors (e.g., four photodiodes) arranged in a square, and a lens (e.g., 2 cm in diameter) to focus received light on the square. If we call the photocurrents $I_1$ through $I_4$, then we form the signal currents $$I_\Sigma = I_1 + I_2 + I_3 + I_4$$
$$I_{\Delta V} = I_1 + I_2 - I_3 - I_4$$
$$I_{\Delta H} = I_1 - I_2 + I_3 - I_4 \quad (3)$$

where 1 and 2 refer to the upper left and right diodes, respectively, and 3 and 4 refer to the lower left and right diodes, respectively. The three signal currents in the equation correspond to the sum (Σ) optical beam (the current produced by the whole area) and the vertical (ΔV) and horizontal (ΔH) difference optical beams (the differences of the currents produced by the upper and lower halves, and the right and left halves, respectively). The estimated raster position is found by normalizing the currents for the difference beams to the sum-beam current:

$$\hat{x}_0 = F^{-1}\left(\frac{I_{\Delta H}}{I_\Sigma}\right) \quad (4)$$

$$\hat{y}_0 = F^{-1}\left(\frac{I_{\Delta V}}{I_\Sigma}\right)$$

where the function F to be inverted depends upon the geometry of the optics; F is always linear in the vicinity of boresight, i.e., (x',y'). Because the difference beams are processed after being normalized to the sum beam, we can expect considerable suppression of the W(x,y) pattern.

Alternatively, the discriminators may be formed of diagonally opposite diode areas. Although equivalent information is provided, simpler circuitry may be used.

The optical monopulse device forms two null lines which are inclined at 45° relative to the x-y coordinate (raster) reference frame. These null lines correspond to two processing channels; the output of a channel changes sign as the (horizontally scanning) raster point crosses its null line. When the vertical raster position is far from boresight, then the zero crossings of the two channels are well separated in time; however, as the raster passes within a pixel of boresight both channels change sign within the time it takes for the raster point to sweep through a pixel. This is a reasonable estimate of TOC.

Suppose a unit length in x or y represents a pixel, that the designated position is (0,0), and that there are two spikes of displayed screen intensity located a few pixels from that position. The screen intensity pattern is given by $$W(x,y) = 1 + 5e^{-(x+3)^2 - y^2} + 5e^{-x^2 - (y+3)^2} \quad (5)$$

where we have added two Gaussian spikes of intensity five to a background of unity, with the spikes occurring at (−3,0) and (0,−3). Conventional Cartesian coordinates are used, rather than a top-to-bottom scan as commonly found. The effect of low-resolution optics in the pointer is to blur the screen pattern by convolving it with a two-dimensional Gaussian (for example). This spatial pattern is approximately $$\tilde{W}(x,y) = 1 + .05 e^{-\frac{(x+3)^2 + y^2}{100}} + .05 e^{-\frac{x^2 + (y+3)^2}{100}} \quad (6)$$

for a 10:1 reduction in resolution. The spatial variation in the pattern is greatly reduced by the low-pass spatial filtering; the eye would see the reduced-resolution for the same ±3 range in x and y.

Although the human eye integrates for about 0.1 second, a photodetector can readily support a signal bandwidth consistent with resolving the event of the raster beam passing through a single pixel. The temporal signal represented in the photodetector current is the instantaneous high-resolution intensity scanned by the raster sweep; however, the effect of the low-resolution 10:1 optics is that the field of view contains about 100 pixels. Thus, because there could be many peaks of intensity within the field of view, attempting to determine the designated position based on intensity is prone to error.

The monopulse approach normalizes the effects of the screen intensity pattern to more accurately locate the designated position. Assume that the pointer has a quad photodetector with the centers of the four received patterns located at x=±½, y=±½. The photocurrents $I_{++}$, $I_{-+}$, $I_{+-}$, $I_{--}$ correspond to detectors with receive patterns centered at (½, ½), (−½, ½), (½, −½) and (½, −½), respectively. We define the currents $$I_\Sigma = I_{++} + I_{-+} + I_{+-} + I_{--}$$

$$I_\backslash = I_{++} - I_{--}$$

$$I_/ = I_{-+} - I_{+-} \quad (7)$$

where $I_\Sigma$ is the sum-pattern reference, and the two difference currents have been subscripted with slashes denoting their respective null lines, i.e., $I_\backslash$ is zero when the raster point lies along the 45° line running from second to fourth quadrants, and $I_/$ is zero when the raster point lies along a 45° line from the first to fourth quadrants. When the raster point passes nearest the designated position at (0,0)—it may not pass precisely through the pixel because the raster scan is not locked to the human pointing—both difference currents will change sign within an interval corresponding to the time it takes the beam to move between pixels. This event works for almost all angular rotations of the pointer; for the rare case when the raster scan runs parallel to one of the null axes, then slightly modified logic will preserve operation. Either of these events, or their average, may be taken as identifying the designated position, because hand tremor will vary the designated position by more than the residual error in this estimation process.

The raster scans $W(x_0,y_0)$ at each instant; the effect of the pointer optics is that the raster spot produces photocurrent proportional to $W(x_0,y_0)$ in each detector element, but over a range of pixels corresponding to the reduced resolution.

Each of the detectors has a peak in its spatial gain pattern which is displaced in x or y (or both) from the others. Assume unity detector slope efficiency, given in Amps/Watt, which conveys the relationship between optical power and detector current.

Then, $$\frac{I_t}{I_\Sigma} = \frac{e^{-\frac{(x_0-\frac{1}{2})^2+(y_0-\frac{1}{2})^2}{100}} - e^{-\frac{(x_0+\frac{1}{2})^2+(y_0+\frac{1}{2})^2}{100}}}{e^{-\frac{(x_0-\frac{1}{2})^2+(y_0-\frac{1}{2})^2}{100}} + e^{-\frac{(x_0-\frac{1}{2})^2+(y_0-\frac{1}{2})^2}{100}} + e^{-\frac{(x_0-\frac{1}{2})^2+(y_0+\frac{1}{2})^2}{100}} + e^{-\frac{(x_0+\frac{1}{2})^2+(y_0+\frac{1}{2})^2}{100}}} \quad (8)$$

and $$\frac{I_t}{I_\Sigma} = \frac{e^{-\frac{(x_0-\frac{1}{2})^2+(y_0-\frac{1}{2})^2}{100}} - e^{-\frac{(x_0+\frac{1}{2})^2+(y_0+\frac{1}{2})^2}{100}}}{e^{-\frac{(x_0-\frac{1}{2})^2+(y_0-\frac{1}{2})^2}{100}} + e^{-\frac{(x_0-\frac{1}{2})^2+(y_0-\frac{1}{2})^2}{100}} + e^{-\frac{(x_0-\frac{1}{2})^2+(y_0+\frac{1}{2})^2}{100}} + e^{-\frac{(x_0+\frac{1}{2})^2+(y_0+\frac{1}{2})^2}{100}}} \quad (9)$$

These may be simplified to $$\frac{I_t}{I_\Sigma} = \frac{\sinh\left(\frac{y_0+x_0}{100}\right)}{\cosh\left(\frac{y_0}{100}\right)\cosh\left(\frac{y_0}{100}\right)} \quad (10)$$

$$\frac{I_t}{I_\Sigma} = \frac{\sinh\left(\frac{y_0+x_0}{100}\right)}{\cosh\left(\frac{x_0}{100}\right)\cosh\left(\frac{y_0}{100}\right)}$$

Thus, the paired detectors produce null lines along $x_0=y_0$ and $x_0=-y_0$. The contrast between full brightness and dark on the screen must be restricted to avoid division by nearly zero.

The raster scan will be considered to be line-by-line and indexed by vertical pixel separation from y=0, with time running at one pixel per second measured relative to x=0. Thus, during line scan n the raster scan point takes on the positions $$y_0=n$$

$$x_0=t \quad (11)$$

The above equations can be used to show that the ideal monopulse recovers full-pixel accuracy in locating the TODP. In addition they demonstrate that un-normalized monopulse, this is, without the division, also will give the correct TODP in most cases.

The reader should not allow the complexity of the above analysis to obscure the underlying simplicity of the monopulse principle.

Appendix C: Beam Configuration

The communications link to the sensors on the display system could use infrared wavelength for which inexpensive optical components are available. (Other wavelengths could also be used.) The sensors located at the corners of the displays would be arranged for wide angle acceptance, and have collecting areas of 1 mm$^2$ and corresponding noise equivalent power (NEP) of $2\times10^{-15}$ W/$\sqrt{Hz}$. Use of a larger-area photodiode would make consideration of the noise figure of the following amplifier unnecessary. We assume that the NEP is not degraded by amplification and that the user is directly in front of the display (but the results can be scaled by $\cos(\Phi)$ for off-angle transmissions, where $\Phi$ is the viewing angle from direct center on the display). The off-angle issue may be overcome, if necessary, by placing two or more photodiodes in parallel with their surface normals separated by an angle selected to make the total photocurrent approximately constant over a large range of viewing angle. Of course, the dark current will be increased in proportion to the number of such diodes.

As a worst case, suppose the pointers are used in a large auditorium at ranges from 10 to 60 m from the display wall. With current technology, the individual screens can be expected to be larger than 1 m and smaller than 2 m on a side, and arrayed as a mosaic to form a large viewed surface. Here the received radiation pattern from the pointer would be designed to illuminate a 2-m diameter spot from 60 m distance.

The beam transmitted from the pointer will have a Gaussian profile and approximately 40° illumination angle. This produces a ½-m diameter spot at a distance of about 10 m (30 feet); at a 60-m distance (180 feet) the spot would be about 2 m in diameter. For analytical results, we shall describe the power density of the beam spot at the wall by $$S = \frac{P_0}{2\pi w^2} e^{-\frac{x^2+y^2}{2w^2}} \quad (12)$$

$$w = d\tan\theta/2$$

where $P_0$ is the power, d is the distance from the wall, θ is the angular beam width, and the center of the beam is at (0,0). The angle θ can be adjusted to approximate essentially any optical beam about its main lobe. For our purposes we shall use w=2 m at d=60 m. Notice that the beam edge will be taken to be $x^2+y^2 \approx w^2$, where the power density is down by $e^{-\frac{1}{2}} \approx 0.6$ relative to the peak; this corresponds reasonably well to the usual notion of the half-power width of the beam.

For the 60-m distance the power collected by the photodetector would be 70-dB down from $P_0$. We may use $P_0=1$ mW, and assume that a 20-dB SNR is required for demodulation. Thus, the NEP must be less than $10^{-9}$ mW; this requires a data bandwidth (in-bound data rate) of about 250 kHz or less.

If we add 16 bits for additional capabilities, the pointer will transmit 64 bits at 256 kbit/sec. (a 0.25-msec. burst) at an average rate of approximately 10/sec. If we consider 32 users randomly transmitting at 10/sec. each, then the probability of two bursts colliding is about 6%. Considering that 10/sec. is a reasonably high update rate, missing every sixteenth burst, on the average, is not a problem. This simple burst format for channel access may be considered a baseline approach. Reducing the maximum pointing range or the number of transmitted bits to 48 would solidify this approach.

If a variation in the assumed parameters demands a reduction in the data rate, then an alternative approach to channel access would be to employ spread-spectrum signaling to support CDMA. To reduce the power of a single simultaneous user to a negligible level, compared to the NEP, would require about 128 chips per bit. Thus, the chipping rate would be approximately 32 Mchip/sec. This would complicate the processing in the display system.

The communication link must be timed so that TOT and TODP are meaningful. Thus, even if spread-spectrum signaling is not required for multiple access, it may be desirable to employ some spreading to ensure that the timing accuracy is adequate.

Appendix D: Thermal Noise in the Pointer Circuitry

Thermal noise affects pointing accuracy.

Assume that the pointer lens has a 2-cm diameter. For a wavelength of 0.5 gm this would produce a 25-μradian beam, which we will assume is broadened by a factor of two due to an apodization (employed to lower side lobes). At a distance of 60 m the screen resolution of a 50-μradian beam is 3 mm.

In monopulse processing, accuracy is the nominal resolution divided by the square root of the signal-to-noise ratio. Three mm is ten pixels on a standard VGA monitor, which would not normally be viewed from any significant distance.

An important fact in pointing accuracy is the SNR presented to the human eye, relative to the SNR achieved using reasonable optics and a photodetector. For a raster-scanned display, the average intensity per pixel, as perceived by the time-averaging human eyeball, is 50- to 60-dB lower than the peak intensity produced as the raster point scans past the pixel. The SNR for even a soft background screen intensity is immense.

Monopulse processing has the advantage of allowing a tradeoff between optical resolution and SNR in obtaining a desired pointing accuracy. When fine-grained pointing accuracy is required, integration time may be lengthened to increase SNR. Typically the system will need to be able to resolve a spot of 10 to 30 pixels for SNRs from 20 to 30 dB.

Appendix E: Pseudo-Raster Scanning

If the basic pseudo-raster scan comprises a top-to-bottom-to-top scan of a horizontal line, followed by a left-to-right scan of a vertical line, then $x_0$ and $y_0$ can be determined uniquely from $$y_0 = v\left(\frac{t_b - t_a}{2}\right) \quad (13)$$

$$x_0 = v\left(t_c - \frac{t_b + t_a}{2} - T\right)$$

where v is the scanning velocity, T is the time for a single line sweep, and $t_a$, $t_b$ and $t_c$ are local times of the successive zero crossings of the channels. Appropriate word-length descriptions of the three times might be transmitted to the display system. However, since the data must represent x and y positions, it may be desirable to reduce the data within the pointer so that only 20 bits need be transmitted.

The pseudo-raster scan might occur each 50 msec., with the pointer averaging pairs of timing estimates and reporting at a rate of 10/sec. Even this amount of averaging may not be necessary because of the high short-term intensity of the pseudo-raster scan. To minimize communications requirements, the data transmitted will be $\frac{1}{2}(t_a-t_b)$ and $t_c-\frac{1}{2}(T_a+t_b)$; since this is equivalent to the x and y pixel positions, each requires 10 bits.

Thus, the pseudo-raster could be incorporated into a static display without distracting the user, and could be processed by the same pointer used for raster-scanned displays.

What is claimed is:

1. Apparatus which enables a user to communicate with an image appearing on a display surface associated with a computer system, the image appearing on the display surface including an object that represents a control that can be rotated in the image to actuate a software feature, the display surface being characterized by predetermined time-varying light emanations from the surface, the time variations of the emanations being sufficient to enable a determination of a localized area on the surface which is the source of portions of the light emanations, the interface comprising a hand-held pointer having
an axis that can be aimed at the object that represents a control that can be rotated in the image while the pointer is held at a location remote from the surface, the pointer being rotatable about the axis while being aimed, and
sensors configured to receive portions of the light emanations from the object that represents a control that can be rotated in the image, and
circuitry configured to determine that the hand-held pointer is being rotated based on signals from the sensors and to cause rotation of the object to actuate the software feature based on determination of the rotation.

2. Apparatus which enables a user of a computer system to operate interactively with an object that has a surface characterized by visible variations, comprising a scanner controllable to impose a modulating pattern of radiation on the object to cause a modulated pattern of reflected emanations that is different from the visible variations, the pattern being sufficient to enable a determination, from the modulated pattern of reflected emanations, of a localized area of the visible variations on the object which is a source of reflected portions of the radiation, the modulated pattern of reflected emanations comprising a vertical scan of a horizontal line preceded or followed by a horizontal scan of a vertical line, and a hand-held pointer having
an axis that can be aimed at a localized area of the visible variations of the object, and
a sensor that receives portions of the modulated pattern of reflected emanations from the localized area of the visible variations, and
circuitry configured to determine the localized area of the visible variations of the object to which the pointer is aimed based on signals from the sensor.

3. The apparatus of claim 1 or 2 wherein
the emanations differ at different positions, and
the circuitry identifies the location of each localized area in a series of localized areas based on differences in the emanations.

4. The apparatus of claim 1 or 2 wherein the differences comprise differences in time of occurrence.

5. The apparatus of claim 1 or 2 wherein the differences in time of occurrence are associated with raster scanning of the positions.

6. The apparatus of claim 1 or 2 wherein the emanations comprise electromagnetic radiation.

7. The apparatus of claim 1 or 2 wherein the emanations comprise visible light or non-visible radiation.

8. The apparatus of claim 1 or 2 wherein the emanations originate at the localized area.

9. The apparatus of claim 1 or 2 wherein the emanations are reflected from the localized area.

10. The apparatus of claim 1 or 2 wherein the reflections are of scanned emanations.

11. The apparatus of claim 1 wherein the scanned emanations are directed to at least one passive everyday object.

12. The apparatus of claim 1 or 2 wherein the circuitry generates a monopulse position signal as a result of a monopulse processing technique and the monopulse position signal carries information about the timing of the emanations.

13. The apparatus of claim 1 or 2 wherein the circuitry derives a timing signal from the monopulse position signal.

14. The apparatus of claim 1 or 2 wherein the circuitry is part of or attached to the pointer.

15. The apparatus of claims 2 further comprising a communication channel from the circuitry which identifies the localized areas at which the user is aiming the pointer, to the pointer, and wherein the pointer includes an indicator for conveying information to a user based on data received via the communication link.

16. The apparatus of claims 1 or 2 wherein there are two or more of said pointers.

17. The apparatus of claims 1 or 2 further comprising an event mechanism which enables the user to generate events associated with a localized area at which he is aiming the pointer.

18. The apparatus of claim 1 or 2 wherein the event mechanism is part of or attached to the pointer.

19. The apparatus of claim 1 or 2 wherein the events generated by the event mechanism are represented as event signals delivered to the circuitry.

20. The apparatus of claim 1 or 2 wherein the event signals are carried by wire.

21. The apparatus of claim 1 or 2 wherein the event signals are carried by electromagnetic radiation.

22. The apparatus of claim 1 or 2 further comprising a wireless communication channel for carrying the monopulse signal.

23. The apparatus of claim 1 or 2 wherein the event signals are carried on a coded channel.

24. The apparatus of claim 1 or 2 wherein the event signals are carried on a spread spectrum channel.

25. The apparatus of claim 1 or 2 wherein the circuitry generates a monopulse position signal as a result of a monopulse processing technique.

26. The apparatus of claim 1 or 2 further comprising a wireless communication channel for carrying the monopulse position signal.

27. The apparatus of claim 1 or 2 wherein the communication channel comprises a coded channel.

28. The apparatus of claim 1 or 2 wherein the channel comprises a spread-spectrum channel.

29. The apparatus of claim 2 wherein the modulating pattern of radiation comprises a time varying pattern.

30. Apparatus which enables a user to interact with a display surface, the display surface displaying an object that represents a control that can be rotated in the image to actuate a software feature, comprising a hand-held pointer that includes a sensor arranged so that when the pointer is aimed at the object displayed on the display surface of the surface, from a location remote from the surface, light emanating from the object is received at the sensor, and circuitry connected to the hand-held pointer and configured to determine changes in the angular orientation of the pointer about an axis generally extending between the pointer and the surface and to cause rotation of the object to actuate the software feature based on determination of the rotation.

31. The apparatus of claim 30, in which the sensor includes three sensing elements and the circuitry determines the changes based on analysis of output signals from the three sensing elements.

32. Apparatus which enables a user to interact with a passive object by pointing at selected visibly-distinct parts of a surface of the object comprising:

a source that projects radiation onto the surface, the radiation being modulated in a pattern that permits different locations of the surface to be distinguished on the basis of radiation reflected from them, the modulated pattern comprising a vertical scan of a horizontal line preceded or followed by a horizontal scan of a vertical line, a hand-held pointer that includes a sensor arranged so that when the pointer is aimed at one of the visibly distinct parts of the surface, the sensor receives radiation reflected from the part, and circuitry connected to the sensor and configured to determine a visibly-distinct part of the surface to which the pointer is being aimed based on the modulated pattern of radiation received at the sensor.

33. The apparatus of claim 32 in which the radiation is modulated as a pseudo raster scan.

34. The apparatus of claim 32 in which the circuitry also uses information about the state of modulation of the radiation in determining the part to which the pointer is aimed.

35. The apparatus of claim 32 in which the modulation includes projecting radiation on different parts of the surface at different times.

36. The apparatus of claim 32 in which the surface of the object is two-dimensional.

* * * * *